United States Patent Office 3,549,549
Patented Dec. 22, 1970

3,549,549
SODIUM CHLORIDE DESICCANT TABLET
Joseph H. Henderson, 5400 McDermott Drive,
Berkeley, Ill. 60163
No Drawing. Filed July 12, 1967, Ser. No. 652,712
Int. Cl. C09k 3/18
U.S. Cl. 252—194                           7 Claims

ABSTRACT OF THE DISCLOSURE

A desiccant tablet or pellet characterized by a highly deliquescent salt held in a matrix affording good structural qualities while the deliquescent salt is undergoing change incident to its deliquescence, and also characterized by additives in the matrix and intimately mixed therewith to provide lubrication between adjacent pellets, reduction in the pH of liquid emerging from the pellet, and a controlled rate of deliquescence.

---

The tablet or pellet according to the present invention finds particular application in the removal of moisture from compressed air systems where it is imperative to provide completely dry compressed air for a number of manufacturing processes. Previous desiccant materials for removing moisture have oftentimes caused problems of corrosion, and in addition may be extremely caustic. The latter is particularly objectionable in those systems containing components made of amphoteric metals, such as aluminum valve bodies, for example.

Sodium hydroxide, while having the property of attracting moisture readily, is an example of a desiccant having objectionable corrosive properties, and it is especially harmful to metals such as aluminum.

As far as is known, desiccant materials of the prior art have not had the property of providing effective lowering of the dewpoint of compressed air, while at the same time maintaining good structural integrity for the flow therearound of the air. Those materials providing good structural integrity have not been entirely effective in lowering the dewpoint, while those effective for dewpoint lowering have not possessed the proper integrity for air flow therearound.

With the foregoing considerations in mind it is a principal object of this invention to provide an improved desiccant pellet or tablet having good structural integrity for flow of air therearound while providing effective lowering of the dew-point.

Another object is to provide a tablet of the class described containing deliquescent material held in a structural matrix which is essentially preserved in its integrity while deliquesence of the material takes place, to the end that air or other gas being lowered in its dewpoint may effectively circulate in the interstices between discrete pellets.

Still another object is to provide a pellet or tablet which will not agglomerate as the deliquescent materials thereof reach their liquid state to insure the passage of air or gas around the pellet or tablet at all times.

A further object is to provide a pellet which has the deliquescent components thereof reduced in pH value to the end that the corrosive properties of liquid emanating from the pellet are greatly reduced.

The nature and scope of the invention are best illustrated in a formulation covering a range of powdered materials which are carefully mixed in a pug mill or any other suitable mixing machine to provide a substantially homogeneous mix which is transferred to a machine where the powdered mixture is compressed into discrete tablets or pellets. A Stokes tableting press is an example of a machine taking the powdered mixture and compressing the same into such discrete tablets or pellets.

PREFERRED FORMULA

| Ingredient: | Percent by wt. |
|---|---|
| Sodium chloride (NaCl), commercial grade, passing #30 screen and supplied as Starflake dendritic salt | 81.0 |
| Magnesium Chloride ($MgCl_2$), commercial grade, passing #16 screen with 50% retained on #30 screen | 8.4 |
| Finely powdered neutral soap as a binder and lubricant between pellets | 2.1 |
| Milk Sugar or other hygroscopic sugar as a binder, such as Frodex | 5.4 |
| Anhydrous sodium meta-silicate and homologues thereof to lower pH of deliquescent $MgCl_2$ | 1.1 |
| Sodium bi-carbonate to lower pH of deliquescent $MgCl_2$ | 2.0 |
| | 100.0 |

Plus:
Hydrogenated powdered vegatable oil as lubricant for pellet making such as Sterotex ____ 0.3

However, the ingredients above named in a preferred formula may be suitably varied, and calcium chloride ($CaCl_2$) may be substituted as a desiccant agent. It is not as deliquescent as magnesium chloride and, on the other hand, is more chemically active than magnesium chloride.

The ingredients may be varied as follows:

| Ingredient: | Parts by wt. |
|---|---|
| Sodium chloride | 75.0–85.0 |
| Magnesium chloride | 2.0–70.0 |
| Finely powdered soap | 0.50– 5.0 |
| Milk sugar (or other hygroscopic sugar) | 2.0– 8.0 |
| Anhydrous silicate | 1.0– 5.0 |
| Sodium bicarbonate | 1.0– 5.0 |
| Sterotex | 0.3– 1.0 |

The sodium chloride in the above and preceding formulae does not act as a desiccant, but rather as a matrix supporting the deliquescent material. It has a certain skeletal or structural quality supporting the deliquescent materials as they are picking up moisture from the air or gas circulating in the interstices of a large mass of discrete pellets or tablets.

White alkaline earth chlorides such as magnesium chloride or calcium chloride contribute to the greatest extent in removing moisture, the sugar also has an hygroscopic effect, while also having a certain binding effect in the matrix. As a result a controlled rate of deliquesence is achieved.

The finely divided soap acts to form a film of lubrication between the pellets to prevent them from agglomerating. It moreover forms an emulsion with oil or other vapors present in the compressed air or gas. The silicate present, as does also the sodium bicarbonate, acts to reduce the pH of the liquid dropping by gravity from the pellets as the surface tension is lowered by the increasing water content. Absent the silicate and the bicarbonate the liquid would be excessively corrosive, and the presence of the silicate and bicarbonate maintains the liquid at a pH of 8 or 9.

In those cases where the lowest dew point is desired the amount of deliquescent chloride (magnesium or calcium) is increased to the maximum consistent with being able to support the same in the dendritic sodium chloride matrix.

The pellets or tablets described are formed from an intimately mixed loose pulvurulent mixture thereof in the Stokes machine described at 75,000 p.s.i. to provide a dense, structurally stable discrete pellet approximately 1″ in diameter and about ⅝″ thick.

I claim:

1. The method of making a desiccant tablet or pellet having a controlled rate of deliquescence which comprises intimately mixing of finely powdered ingredients in proportions ranging as follows:

| Ingredient: | Parts by weight |
|---|---|
| Sodium chloride, dendritic and passing through a 30 mesh screen | 75.0–85.0 |
| A deliquescent chloride of the alkaline earth series | 2.0–70.0 |
| Soap | 0.50–5.0 |
| Anhydrous silicate | 1.0–5.0 |
| Sodium bicarbonate | 0.3–1.0 | and forming said mixture into discrete tablets under pressure.

2. The method of claim 1 wherein said deliquescent chloride is magnesium chloride.

3. The method of claim 1 wherein said deliquescent chloride is calcium chloride.

4. The method of claim 1 wherein said sodium chloride is dendritic in form and provides a support matrix for the deliquescent and hygroscopic portion of said mixture.

5. As an article of manufacture, a desiccant tablet having a controlled rate of deliquescence and having good structural integrity during deliquescence of the deliquescent portions thereof, said tablet consisting essentially of the following ingredients mixed in a finely pulverulent state and compressed to form a tablet:

| Ingredient: | Parts by weight |
|---|---|
| Sodium chloride | 75.0–85.0 |
| A deliquescent chloride of the alkaline earth series | 5.0–50.0 |
| Soap | 0.50–5.0 |
| Anhydrous silicate | 1.0–5.0 |
| Sodium bicarbonate | 0.3–1.0 |

6. The invention of claim 5 wherein said soap prevents agglomeration of said pellets during deliquescence.

7. The invention of claim 5 wherein said sodium chloride is dendritic in form and forms a matrix for the deliquescent and hygroscopic portions of said mixture.

References Cited

UNITED STATES PATENTS

| 3,301,788 | 1/1967 | Cummings et al. | 252—194 |
| 3,390,511 | 7/1968 | Norton | 252—194 |
| 3,334,468 | 8/1967 | Wilcox | 252—194 |

LEON D. ROSDOL, Primary Examiner

I. GLUCK, Assistant Examiner

U.S. Cl. X.R.

55—522; 252—441, 449